United States Patent
Nicholson et al.

[11] Patent Number: 6,112,769
[45] Date of Patent: Sep. 5, 2000

[54] ROSE END ASSEMBLY

[75] Inventors: Joseph A. Nicholson, Broughton in Furness; Duncan Kellett; Louis W. Powell, both of Ulverston, all of United Kingdom

[73] Assignee: Tronic Limited, Cumbria, United Kingdom

[21] Appl. No.: 08/846,765

[22] Filed: Apr. 30, 1997

[30] Foreign Application Priority Data

Apr. 30, 1996 [GB] United Kingdom ................... 9608840

[51] Int. Cl.[7] ............................. F16L 11/00; F16L 35/00; G02B 15/04
[52] U.S. Cl. ................................. 138/109; 285/39; 405/70
[58] Field of Search ........................ 285/39, 110; 175/25; 174/25 R; 137/68.1; 405/170; 403/41; 439/194; 427/118; 138/109

[56] References Cited

U.S. PATENT DOCUMENTS

| | | | |
|---|---|---|---|
| 3,845,450 | 10/1974 | Cole et al. | 339/42 |
| 4,086,939 | 5/1978 | Wilcox et al. | 137/614.03 |
| 4,367,967 | 1/1983 | Albert, Jr. | 403/41 |
| 4,556,756 | 12/1985 | Vecellio | 174/25 R |
| 4,735,440 | 4/1988 | Sauer | 285/110 |
| 4,834,423 | 5/1989 | DeLand | 285/39 |
| 4,924,949 | 5/1990 | Curlett | 175/25 |
| 4,971,096 | 11/1990 | Perrine | 137/68.1 |
| 5,105,854 | 4/1992 | Cole et al. | 138/109 |
| 5,200,234 | 4/1993 | Bertini | 427/118 |
| 5,540,250 | 7/1996 | Mullins | 137/77 |
| 5,722,844 | 3/1998 | Schraeder | 439/194 |
| 5,746,255 | 5/1998 | Walsh et al. | 138/109 |
| 5,807,027 | 9/1998 | Ostergaard | 405/170 |

*Primary Examiner*—Andres Kashnikow
*Assistant Examiner*—Davis Hwu
*Attorney, Agent, or Firm*—Alix, Yale & Ristas, LLP

[57] ABSTRACT

A hose end assembly comprises an adaptor (30) connected to one end of a cable conduit hose (10) for containing liquid medium. The adaptor comprises a body (32) having a barbed extension (44) and a retaining means such as a sleeve (34). The hose is pushed over the barbed extension, and then the sleeve is forced over the hose by means of a jack (60, FIGS. 2 and 3) to compress the hose between the sleeve and the extension. The body and the sleeve can have axially facing bearing surfaces in the form of recesses (42, 50) for engaging with projections on the jack. The sleeve can have internal projections (46, 48) to further compress the hose, and the sleeve and the hose can be in electrical contact with each other. A bend restrictor (90, FIG. 4) can be provided to limit the bending of the hose.

The invention also extends to the use of an assembly to form a termination of a cable conduit hose containing liquid medium.

20 Claims, 3 Drawing Sheets

ROSE END ASSEMBLY

The present invention relates to an assembly comprising an adaptor connected to an end of a cable conduit hose.

There are many situations, particularly in the offshore oil and gas industries, where it is necessary to connect items of equipment, which may be some distance apart. It is known to achieve this by means of a cable conduit hose, i-e. a hose which acts as a conduit for one or more electrical cables extending along it between the items of equipment. Such hoses are commonly filled with oil to provide additional protection for the cables, particularly when the hose is to be used underwater.

In order that the hose can be connected to the interface of the items of equipment, it is usually necessary to fit an adaptor onto each end of the hose. In the case of the offshore oil and gas industries, this is usually done by swaging the adaptor onto the hose. In this method, an exterlally ribbed tubular extension at one end of the adaptor is inserted into the end of the hose, and a tube around the outside of the hose is then swaged down against the hose to press it into contact with the ribbed tubular extension. The engagement between the ribs and the deformed hose material holds the hose tightly and prevents it from being pulled off the adaptor.

The outer tube is permanently deformed by the swagging process thus the connection is permanent. If it is desired to replace a damaged hose then the adaptors at both ends of the hose as well as the hose itself have to be discarded. This is wasteful and costly.

Further, the permanent deformation of the outer tube causes work-hardening, which can result in loss of corrosion resistance.

Viewed from one aspect the invention provides an assembly comprising an adaptor connected to an end of a cable conduit hose for containing liquid medium, said adaptor comprising a body portion, a male portion extending from the body portion to be inserted inside the hose end, and retaining means to retain the hose in place on the male portion, the retaining means being releasable to permit the male portion to be removed from the hose end.

The invention also extends to the use of the above assembly to form a termination of a cable conduit hose containing liquid medium.

Since the retaining means is releasable, the adaptor can be removed from the end of the hose and, if desired, reused. Thus, for example, if a hose is, damaged then it can be replaced without also having to replace adaptors at each end of the hose.

By avoiding permanent deformation of the retaining means there is no work-hardening and loss of corrosion resistance. This is in contrast to the swaged outer tube of the known method. In addition, a variety of materials can be used which could not previously be considered, e.g. hard materials such as Inconel 625, duplex stainless steels or the like.

The adaptor may be useful for hoses which are to be placed in wet or damp environments such as at ground level or underground. It is expected that the adaptor will be particularly useful in underwater environments, i.e. as an underwater adaptor. In preferred embodiments, a liquid-tight seal is formed between the hose and the male portion. In use, the hose will be filled with a liquid medium which will tend to exclude ingress of water. The term "liquid medium" as used in this application is intended to cover very viscous liquids such as gels as well as less viscous liquids such as oils. Particularly when an electric cable it to be enclosed in the hose, it is advantageously filled with a dielectric liquid medium. The hose may alternatively or additionally contain other forms of cable, for example optical cables.

The releasable retaining means may take various forms. Preferably, however, the retaining means comprises a sleeve adapted to fit over the hose and compress the hose against the male portion.

The retaining means may hold the hose in place by an adjustable clamping arrangement. For example an axially split sleeve may be provided together with means for adjusting the inner diameter of the sleeve. Preferably, the sleeve and the male portion are relatively axially movable between a retaining position in which the hose is compressed by the sleeve against the male portion and a releasing position. Thus, in forming the termination of the cable conduit hose, the sleeve and the male portion are relatively axially moved to effect the compression of the hose against the male portion. It is preferred that this relative axial motion is achieved without relative rotation between the sleeve and the hose, thereby avoiding having to overcome friction between the inside of the sleeve and the outside of the hose which would resist such relative rotation.

In general, the inner diameter of the sleeve and the outer diameter of the male portion will be such that, when the sleeve surrounds the part of the hose where the male portion is located (the hose end portion), the hose is compressed against the male portion. Thus, the hose is held on the male portion. When it is desired to release the hose, the sleeve and the male portion are moved apart.

It would be possible for the sleeve to be positioned initially over the hose end portion, followed by insertion of the male portion. However this would involve relative movement of the male portion and the hose material against which it is being radially compressed. In a preferred method, therefore, the sleeve is placed on the hose at a location spaced from the end thereof, the male portion is inserted into the hose end portion, and the sleeve is then moved on to the hose end portion to compress the hose against the male portion. Thus there is no relative axial movement between the hose end portion and the male portion as they are compressed together.

The adaptor is preferably provided in combination with a jack for effecting said relative axial movement of the sleeve and the male portion. The jack may for example comprise two members, one of which members is adapted to engage with the sleeve and the other of which members is adapted to engage with the body portion of the adaptor, the members being movable towards and away from each other. The sleeve and the body portion may have respective side portions, each provided with an axially facing bearing surface for engagement by the jack. Preferably the axially facing bearing surfaces are formed as recesses, e.g. grooves, and the engaging members of the jack are provided with projections for fitting into these recesses.

A tool may be provided separately of the adaptor for effecting the relative axial movement. In a preferred adaptor, the body portion and the sleeve have respective annular recesses for engagement by a tool for effecting said relative axial movement.

Preferably the sleeve is provided with at least one annular inward projection for engaging the hose. This can produce a localised region of compression of the hose against the male portion, which may for example assist with sealing. In a preferred embodiment, two axially spaced annular inward projections are provided. It is also preferred for the male portion to be provided with at least one annular outward projection for engaging the hose. This preferably has a barbed profile tending to resist axial movement of the hose off the male portion. Advantageously, a plurality of annular outward projections are provided.

Although it is not essential to predetermine the relative positions of the sleeve and the male portion when the hose is held in place, this may be desirable. For example, by providing alignment means to indicate when the sleeve and the male portion are in predetermined relative positions, the annular projections may be brought into optimum relative positions for holding the hose in place. In particular, an annular inward projection on the sleeve could be arranged to compress the hose into the recess of a barbed outward projection on the male portion. One way of achieving desired predetermined positioning of the sleeve and the male portion would be to provide the sleeve with a hole which is to align with a recess, e.g. a groove, on the body portion of the adaptor, and to provide a screw passing through the hole and into the recess.

The adaptor may be made of various materials e.g. plastics. In a preferred embodiment, the body portion and the sleeve are made of metal and are arranged to be electrically connected to each other when the hose is connected to the adaptor. Such an arrangement prevents cathodic corrosion between the sleeve and the male portion. The electrical contact may be achieved by relatively tight interengagement between the body portion and the sleeve when the latter is in the retaining position. Preferably, however, an electrically conductive member extends laterally between the body portion and the sleeve. In a preferred embodiment, the electrically conductive member passes through the sleeve into contact with the body portion. The screw referred to above may form such an electrically conductive member.

The integrity of the connection between the hose and the male portion may be assisted by a bend restrictor adapted to fit over the hose in a region adjacent to the retaining means to limit bending of the hose. This can provide strain relief if a pull-out load not coaxial with the male portion is applied to the hose. Kinking is minimised. Preferably, the bend restrictor also fits over an end of the retaining means. The bend restrictor may be made of a plastics materials, preferably an elastomer, e-g. hydrogenated nitrile, and can be integrally moulded on to the retaining means.

Preferably, the body portion is provided with an inlet/outlet to allow liquid medium to be introduced into or removed from the hose.

The adaptor may have male portions at opposite ends thereof, so as to form a connector between two hoses. Preferably, however, the body portion of the adaptor is adapted for connection to an interface of an item of equipment, such as for example, an underwater installation. Thus a cable conduit hose may be provided with an adaptor at each end thereof so as to provide a communication link, via an electric, optical or other cable extending along the hose, between two items of equipment. The hose may be installed at a factory be on site, for example on an offshore platform or ship, prior to placement in an underwater environment.

Certain preferred embodiments of the invention will now be described by way of example only and with reference to the accompanying drawings, in which.

Figure 1:
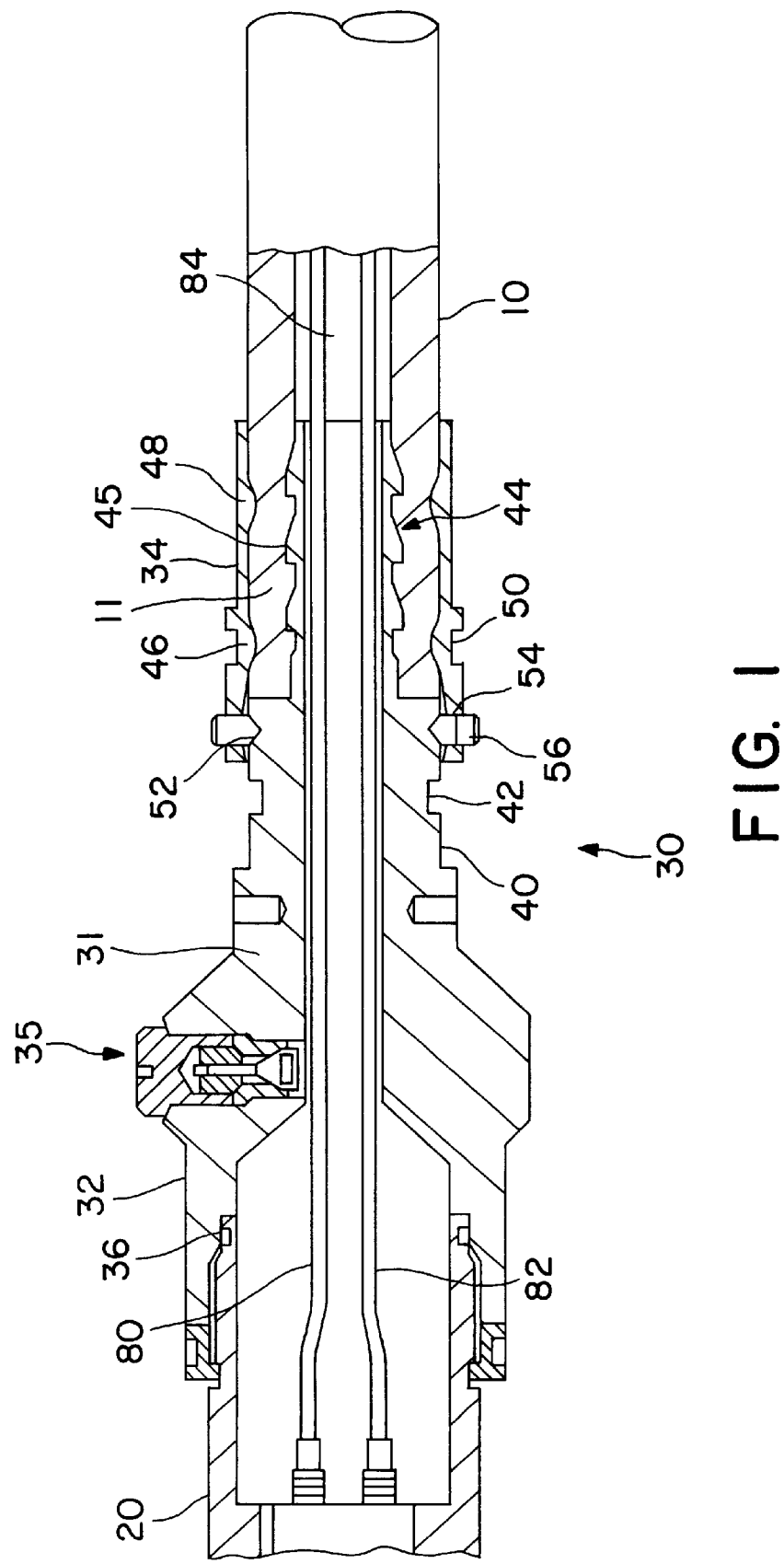
FIG. 1 is a cross-sectional view of a flexible cable conduit hose connected to an interface by means of an adaptor according to a first embodiment of the present invention.

In FIG. 1, a flexible cable conduit hose 10 is connected to an interface 20 by means of an adaptor, generally denoted by the reference numeral 30. The adaptor contains two main parts, a backshell 32 and a sleeve 34.

The backshell 32 is generally tubular and has a body portion 31 and male portion 44. The body portion has an end adapted to connect with the interface 20, and this can take various forms depending on the requirements of the situation. The connection between the body portion 31 and the interface 20 is sealed by seal 36.

The other end 40 of the body portion 31 is of substantially the same external diameter as the hose 10. An annular groove 42 is formed on the outside of the body portion around the end 40. The male portion 44 extends axially from the end 40, and is of a size to engage with the inner surface of the hose 10 when the hose is connected to the backshell. The male portion 44 has external annular protrusions in the form of barbs 45.

The body portion 31 has a valve 35 or filling/vent plug in a wall thereof which enables oil pressure inside the adaptor to be checked and oil to be added or released if necessary to adjust the pressure.

A substantially V-shaped groove 52 is provided on the end 40 of the body portion 31 adjacent to the groove 42. Threaded holes 54 are provided in the sleeve 34, receiving grub screws 56 which extend into the groove 52.

The sleeve 34 is a generally cylindrical member, whose internal diameter is substantially the same as the outer diameter of the hose 10. Two inwardly projecting annular protrusions 46, 48 are provided on the internal surface of the sleeve 34, but in an alternative embodiment the annular protrusions may be omitted, An annular groove 50 is provided on the outer surface of the sleeve.

An end portion 11 of the hose 10 is shown compressed between the sleeve 34 and the male portion 44.

To connect the hose 10 to the adaptor 30, the sleeve 34 is slid onto the hose 10, to a position spaced from the end of the hose. Lubricant can be used if necessary to assist sliding of the sleeve on the hose. The hose is then pushed onto the male portion 44, until its end abuts the end 40 of the body portion of the backshell At this stage, the sleeve 34 remains spaced from the end of the hose, and thus surrounds a part of the hose which does not itself surround the male portion 44. The sleeve 34 is then slid towards the body portion 31 over the hose end portion 11. As the sleeve 34 approaches the body portion 31, the end portion 11 of hose 10 is compressed between the sleeve and the male portion 44, in particular between the barbs 45 on the male portion 44 and the annular protrusions 46, 48 on is the sleeve 34.

Figure 2:
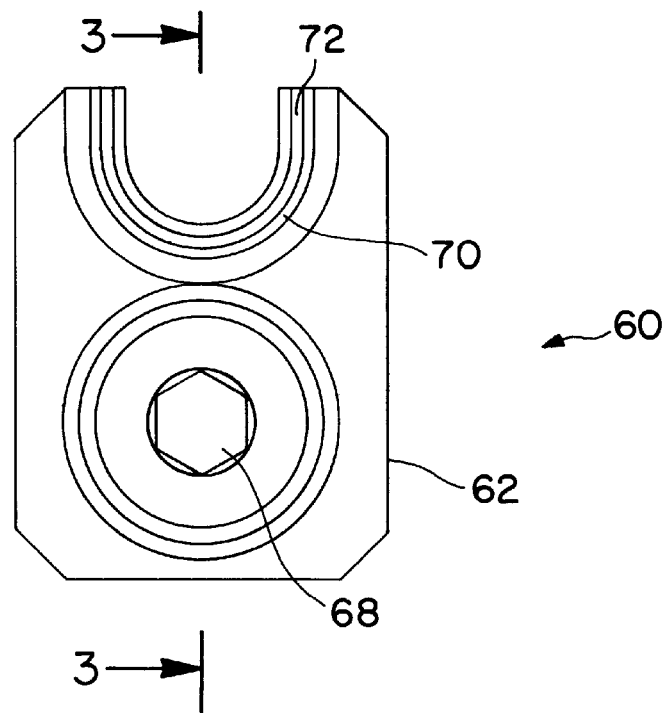
FIG. 2 is an end view of a jack used in the present invention.
Figure 3:
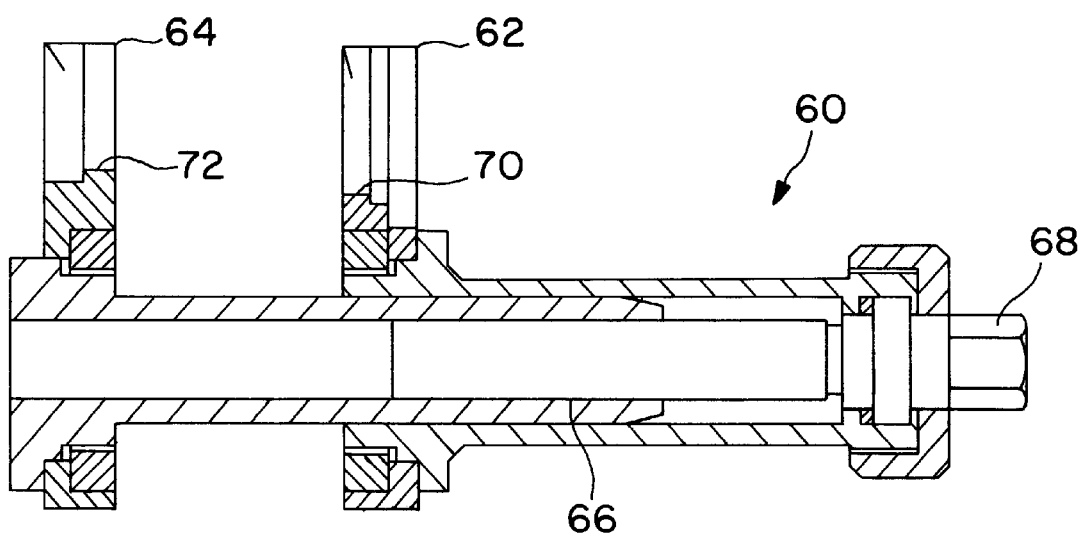
FIG. 3 is a cross-sectional view of the jack, taken along the line A—A in FIG. 2.

To facilitate sliding of the sleeve 34 on to the hose end portion 11, a jack may be used. A suitable jack 60 is shown in FIGS. 2 and 3. As can be seen from FIG. 3, the jack comprises two plates 62, 64, which can be moved towards and away from each other along a shaft 66 by turning a nut 68. Each of the plates 62, 64 has a substantially semi-circular cut-out 70, 72 provided therein. The cut-out 70 has substantially the same diameter as the groove 50 on the sleeve 34, and the cut-out 72 has substantially the same diameter as the groove 42 on the end 40 of the body portion 31. The jack is adapted to contact the sleeve and the body portion from the side, and so there is no need to provide access to the front or rear of the assembly. The jack can therefore be used in situations where the body portion projects from, for example, a large piece of machinery or the like.

To lock the hose onto the adaptor 30, the plates 62, 64 are moved until they have the same separation as the grooves 50, 42. The cut-outs 70, 72 on the jack Go are engaged with the grooves 50 and 42, and the nut 68 is turned to draw the plates 62, 64 towards each other. As a result, the sleeve 34 is pulled over the end portion 11 of the hose which is located on the male portion 44 of the backshell 32. When the threaded holes 54 in the sleeve 34 are above the V-shaped groove 52 on the backshell body portion 31, the jack is removed. The hose is then held tightly and sealingly between the barbed male portion 44 of the backshell 32 and the sleeve 34.

Grub screws 56 are inserted in the holes 54 and groove 52. These screws are not necessary to hold the sleeve in place, as sufficient retaining force is produced by the barbs 45 of the male portion 44. Further retaining force is provided by the inwardly-projecting annular protrusions 46, 48 of the sleeve 34 (although as mentioned previously the annular protrusions may be omitted). Rather, the screws are to ensure that the backshell 32 and the sleeve 34 are in electrical contact, to prevent any corrosion which may result from the backshell and sleeve being at differing electrical potentials.

In order to remove the adaptor 30 from the end of the hose the grub screws 56 are removed and the jack 60 is used to engage and urge apart the backshell 32 and the sleeve 34. The sleeve is forced by the jack to slide along the hose until it is in a releasing position i.e. a position in which it no longer surrounds the hose end portion 11. The hose can then be pulled off the male portion 44 and the adaptor is available for re-use.

In the embodiment illustrated in FIG. 1, the hose is used as an electrical cable conduit. Electric cables 80, 82 are passed along the hose, and connected at each end by adaptors to the interfaces of underwater installations. If the conduit is to be used in an undersea environment, for example in an oil drilling installation, then it is advisable to "pressure balance" the hose. This means ensuring that the inside of the hose and the environment outside the hose are at substantially the same pressure, to prevent the conduit being damaged by the unbalanced external pressure. One particularly preferred method of pressure balancing the conduit is to fill it with a liquid medium, such as oil 84.

In order to achieve pressure balancing, therefore, the hose is preferably flexible enough to transmit pressure through its walls. At the same time the hose should preferably have a low tensile elongation, to avoid the cables being broken by snag loads. For example, if the conduit snags on something partway along its length, and the tensile elongation of the hose is too high, then the hose will stretch so far that the electric cables inside it snap.

A suitable hose can be formed from an inner layer of nitrile and an outer layer of PVC and nitrile, with a reinforcing braid embedded between the layers. The reinforcing braid may be formed from Kevlar (trade mark) fibre, preferably with the braid wound at an angle of 30° to the longitudinal axis of the hose. A preferred hose made of these materials has an outer diameter of 0.9 inches (22.8 mm), an inner diameter of 0.5 inches (12.7 mm), an outer layer of 0.095 inches (2.41 mm) thickness and an inner layer of 0.105 inches (2.67 mm) thickness. Using such a hose, it has been found that the connection with the adaptor can withstand an axial load of 8000N without failure. Pressure balancing between the oil in the hose and the environment outside to within 1–2 psi (6.9–13.8 kPa) can be achieved.

Figure 4:
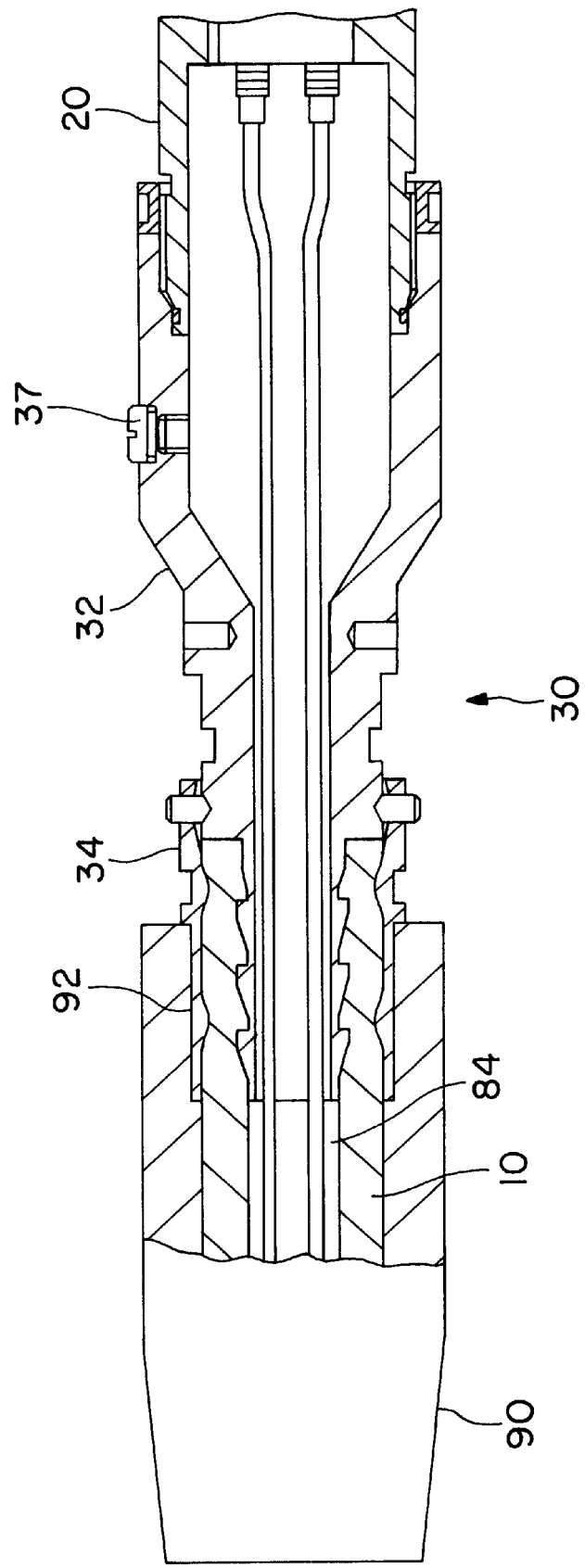
FIG. 4 is a cross-sectional view of a second embodiment of the adaptor.

A second embodiment of adaptor is shown in FIG. 4. This is generally similar to the first embodiment, but has a bend restrictor 90 moulded onto the sleeve 34. This serves to reduce the angle through which the hose can be bent immediately adjacent to its connection with the male portion, which reduces the bending stress in this region. The bend restrictor 90 is formed as a basically tubular member, whose internal diameter is substantially the same as the external diameter of the hose. A rebate 92 is provided at one end of the bend restrictor 90 to accommodate the end of the sleeve 34. The restrictor is formed from moulded plastic, more particularly a moulded elastomer such as hydrogenated nitrile.

The second embodiment of adaptor, shown in FIG. 4, also differs from the first embodiment in that a simple screw closure 37 is provided rather than the valve 35.

The connection system described above has a number of advantages over the prior art methods involving swaging. Replacement of a damaged hose can be effected without also having to replace the adaptor. Further, a larger variety of materials can be utilised, as swaging cannot be used with hard materials such as Inconel 625, duplex stainless steels and the like. The reduced number of components also leads to reduced costs and a simpler installation method.

What is claimed is:

1. Apparatus comprising an adaptor connected to an end of a cable conduit hose for containing liquid medium, said adaptor comprising:
   a body portion,
   a male portion extending from the body portion and inserted inside the hose end;
   a sleeve engaging an outer surface of the hose end to compress the hose end against the male portion, the sleeve then being in a retaining position in which the sleeve retains the hose end in place on the male portion, the sleeve being axially movable relative to the male portion from said retaining position to a releasing position in which it no longer compresses the hose end against the male portion, so to permit the male portion to be removed from the hose end; and
   a jack for effecting said relative axial movement of the sleeve and the male portion.

2. An apparatus as claimed in claim 1, wherein the sleeve and the body portion have respective side portions, each provided with an axially facing bearing surface for engagement by the jack.

3. An apparatus as claimed in claim 2, wherein said axially facing bearing surfaces are formed as recesses in the side portions.

4. An apparatus as claimed in claim 1, wherein the male portion is provided with at least one annular outward projection for engaging the hose.

5. An apparatus as claimed in claim 1, wherein the body portion is provided with an inlet/outlet, to allow liquid medium to be introduced into or removed from the hose.

6. An assembly comprising an adaptor connected to an end of a cable conduit hose for containing liquid medium, said adaptor comprising;
   a body portion;
   a male portion extending from the body portion and inserted inside the hose end; and
   a sleeve having engaging an outer surface of the hose end to compress the hose end against the male portion, the sleeve then being in a retaining position in which the sleeve retains the hose end in place on the male portion, the sleeve being axially movable relative to the male portion from said retaining position to a releasing position in which it no longer compresses the hose end against the male portion, so as to permit the male portion to be removed from the hose end, the sleeve being provided with at least one annular inward projection for engaging the hose.

7. An assembly an claimed in claim 6, wherein the body portion and the sleeve have respective annular recesses for engagement by a tool for effecting said relative axial movement.

8. An assembly an claimed in claim 6, comprising a bend restrictor adapted to fit over the hose in a region adjacent to the sleeve to limit bending of the hose.

9. An assembly as claimed in claim 8, wherein said bend restrictor also fits over an end of the sleeve.

10. Use of an assembly as claimed in claim 6 to form a termination of a cable conduit hose containing liquid medium.

11. An assembly as claimed in claim 6, wherein the male portion is provided with at least one annular outward projection for engaging the hose.

12. An assembly as claimed in claim 6, wherein the body portion is provided with an inlet/outlet, to allow liquid medium to be introduced into or removed from the hose.

13. An assembly comprising an adaptor connected to an end of a cable conduit hose for containing liquid medium, said adaptor comprising;

a body portion composed of metal;

a male portion extending from the body portion and inserted inside the hose end; and a sleeve composed of metal and engaging an outer surface of the hose end to compress the hose end against the male portion, the sleeve then being in a retaining position in which the sleeve retains the hose end in place on the male portion, the sleeve being axially movable relative to the male portion from said retaining position to a releasing position in which it no longer compresses the hose end against the male portion, so as to permit the male portion to be removed from the hose end, the body portion and the sleeve being arranged to be electrically connected to each other when the hose is connected to the adaptor.

14. An assembly as claimed in claim 13, wherein an electrically conductive member extends laterally between the body portion and the sleeve.

15. An assembly an claimed in claim 13, wherein the body portion and the sleeve have respective annular recesses for engagement by a tool for effecting said relative axial movement.

16. An assembly as claimed in claim 13, wherein the male portion is provided with at least one annular outward projection for engaging the hose.

17. An assembly an claimed in claim 13, comprising a bend restrictor adapted to fit over the hose in a region adjacent to the sleeve to limit bending of the hose.

18. An assembly as claimed in claim 17, wherein said bend restrictor also fits over an end of the sleeve.

19. An assembly as claimed in claim 13, wherein the body portion is provided with an inlet/outlet, to allow liquid medium to be introduced into or removed from the hose.

20. Use of an assembly as claimed in claim 13 to form a termination of a cable conduit hose containing liquid medium.

* * * * *

UNITED STATES PATENT AND TRADEMARK OFFICE
CERTIFICATE OF CORRECTION

PATENT NO. : 6,112,769
DATED : September 5, 2000
INVENTOR(S) : Nicholson et al

It is certified that error appears in the above-identified patent and that said Letters Patent is hereby corrected as shown below:

On the title page,

In the title, delete "ROSE" and insert --HOSE--.

Signed and Sealed this

First Day of May, 2001

Attest:

NICHOLAS P. GODICI

*Attesting Officer*     *Acting Director of the United States Patent and Trademark Office*